United States Patent [19]

Beaujean et al.

[11] Patent Number: 5,505,875
[45] Date of Patent: Apr. 9, 1996

[54] STORAGE-STABLE ENCAPSULATED SODIUM PERCARBONATE AND PROCESS FOR ITS PRODUCTION

[75] Inventors: Hans-Josef Beaujean, Dormagen; Franz-Josef Carduck, Haan; Jens Bode, Duesseldorf, all of Germany

[73] Assignee: Degussa Aktiengesellschaft, Frankfurt am Main, Germany

[21] Appl. No.: 199,289

[22] PCT Filed: Aug. 24, 1992

[86] PCT No.: PCT/EP92/01941

§ 371 Date: May 20, 1994

§ 102(e) Date: May 20, 1994

[87] PCT Pub. No.: WO93/04982

PCT Pub. Date: Mar. 18, 1993

[30] Foreign Application Priority Data

Sep. 3, 1991 [DE] Germany ............... 41 29 242.1
Mar. 10, 1992 [DE] Germany ............... 42 07 554.8

[51] Int. Cl.$^6$ ............ C01B 15/10; B01J 13/04; B05D 7/00
[52] U.S. Cl. ............ 252/186.27; 252/99; 252/174.13; 252/358; 427/213.36; 427/220; 427/240; 423/415.2; 428/402.24
[58] Field of Search ............ 252/174.13, 186.27, 252/358, 99; 264/4.4; 427/213.36, 220, 240; 423/415.2; 428/402.24

[56] References Cited

U.S. PATENT DOCUMENTS

| 3,161,602 | 12/1964 | Herbig et al. | |
|---|---|---|---|
| 4,090,973 | 5/1978 | Maguire, Jr. et al. | 252/89 R |
| 4,126,717 | 11/1978 | Mazzola | 427/220 |
| 4,131,562 | 12/1978 | Lutz et al. | 252/186.27 |
| 4,327,151 | 4/1982 | Mazzola | 252/99 X |
| 4,657,784 | 4/1987 | Olson | 427/213 |
| 4,919,841 | 4/1990 | Kamel et al. | 252/186.27 X |
| 5,002,695 | 3/1991 | Schulz et al. | 252/358 X |

FOREIGN PATENT DOCUMENTS

| 0030759 | 6/1981 | European Pat. Off. . |
|---|---|---|
| 0048312 | 3/1982 | European Pat. Off. . |
| 0306465 | 3/1989 | European Pat. Off. . |
| 7202746 | 9/1972 | France . |
| 2203885 | 8/1972 | Germany . |
| 3732947 | 4/1989 | Germany . |

*Primary Examiner*—Richard D. Lovering
*Attorney, Agent, or Firm*—Beveridge, DeGrandi, Weilacher & Young

[57] ABSTRACT

Storage stability of finely divided sodium percarbonate is improved by melt-coating of water-insoluble encapsulation agents.

25 Claims, No Drawings

STORAGE-STABLE ENCAPSULATED SODIUM PERCARBONATE AND PROCESS FOR ITS PRODUCTION

The invention describes a new recommendation for optimizing the melt-coating of water-soluble capsule substances on finely divided sodium percarbonate to increase its storage stability under practical use conditions.

Sodium percarbonate, an addition compound in which 1.5 moles of $H_2O_2$ is included in the crystal lattice for each mole of $Na_2CO_3$, is an important candidate to replace sodium perborate tetrahydrate, which is currently in wide use as an oxidizing agent, such as a bleaching agent in washing and cleaning agents. The decisive weakness of sodium percarbonate it its instability in storage, as in moist atmosphere and/or in mixtures with active components such as commonly occur in washing and cleaning agents.

For a long time, and until very recently, attempts were made to counter this weakness by using various principles, particularly addition of stabilizing components to the percarbonate and/or encapsulation of the percarbonate particles with suitable protective substances. Although some partial successes have been achieved here, there has not yet been a proposal which deals, as an integral part, with the manifold problems and aspects that have to be considered in this respect. Without claiming completeness, problems here include: The causes of the undesired decomposition of sodium percarbonate in storage and in practical use are complex. Moisture, thermal effects, and interaction with other components of the mixture, even as solids, lead to degradation of the peroxide. Water is a decomposition product, and it in turn catalyzes further decomposition of the peroxide. Suggestions based on the state of the technology, for encapsulating the percarbonate crystals with a water-repelling or water-impermeable capsule material obviously do not adequately consider many potentially harmful factors. When the encapsulants are coated as aqueous preparations, catalytic amounts of water are included in the encapsulated particle, even if water is removed immediately by simultaneously drying the coated powder. Removal of those catalytic amounts of water in the drying process is impeded or prevented by the water-tight film of encapsulant which is produced. Thus the germ of an undesired decomposition process is built into every sodium percarbonate particle in an uncontrollable manner.

It is well known that attempts have been made to apply suitable encapsulating substances as melts and/or in solution in organic solvents. That only appears to diminish the set of problems discussed. For example, German Laid-Open Patent 22 03 885 recommends applying fatty acids, fatty acid glycerol esters, fatty acid alkanolamides and/or long-chain aliphatic alcohols to finely divided sodium percarbonate as water-insoluble encapsulants. For instance, hot molten coating material is sprayed over the particles which move in a fluidized bed heated above the melting point of the coating material. Then the fluidized bed of coated percarbonate is cooled by a cold gas. In another example embodiment, hot molten coating material is added to a hot layer of particles and shaken mechanically, as in a Lodige-Morton mixer, and then allowed to cool. Even if the solid encapsulating agent is used in conjunction with organic solvents, substantial thermal stress on the sodium percarbonate is unavoidable. For example, a non-aqueous solution of the coating material is sprayed over the particles moving in a fluidized bed, with hot air blown in continuously to evaporate the solvent. European Patent 030 759 shows comparable recommendations.

Sodium percarbonate is held in a fluidized layer with hot air (ca. 90° to 100° C.) and then coated with a melt of the coating material, and cooled. Coating materials used here include long-chain hydrocarbons, as well as fatty acids and fatty alcohols. Both this process and the teaching of the previously mentioned German Laid-Open Patent assume a selected type of process in which the thermal stress on the solid sodium percarbonate particles during the melt coating of the encapsulant involves thermal stress of the core material. That causes initial decomposition of peroxide, forming the decomposition product, water, and including it in the encapsulated percarbonate particle.

The invention is based on the objective of recommending a process for melt-coating finely divided sodium percarbonate with encapsulants that are solid under standard conditions, making it possible to limit or even completely exclude, in a previously unknown manner, the various sources of problems in obtaining a percarbonate product that is storage-stable over a long term. The invention is also intended to make available a type of process that is suitable for producing on a large scale the quantities of products based on sodium percarbonate and stabilized in this manner. This latter viewpoint is of decisive importance for the practical usefulness of a technical theory. Replacement of perborate by percarbonate in textile washing agents, considered by itself, allows concepts to appear promising only if they can inhibit and stabilize finely divided sodium percarbonate on the industrial scale with technologically and economically acceptable cost.

THE OBJECT OF THE INVENTION

The teaching of this invention has as its object application of melt-coating a coating material which is solid at room temperature on finely divided solids, in which the finely divided solid material is centrifugally atomized in a continuous stream through a fog of molten coating material, which is also continuously produced, to accomplish non-aqueous encapsulation of solid sodium percarbonate with a hydrophobic protective coating of a material that is solid at room temperature. One preferred embodiment uses residence times of the sodium percarbonate in the molten fog zone of not more than a second and preferably less than a second. Also, one important embodiment of the teaching of the invention cools the freshly encapsulated sodium percarbonate particles immediately using a coolant gas stream based on air and liquid nitrogen as the preferred working material in the meaning of the operation according to the invention.

In another embodiment, the invention concerns sodium percarbonate powder as a practically unagglomerated pourable material having a water-repellent coating as a protective capsule, which can also contain known stabilizers for sodium percarbonate in the sodium percarbonate core and/or in the encapsulating material, and which can be produced by the process of the invention.

DETAILS OF THE TEACHING OF THE INVENTION

The advantages of the process according to the invention are obvious in view of the complex problems indicated initially: The finely divided solid material based on sodium percarbonate, at room temperature or precooled if desired, is centrifugally atomized through a zone of a fog of the molten coating material without the need for heating the solid particles. The heat input required is limited, in the process of the invention, to melting the encapsulant which is available as a fog of finely disperse liquid of controllable density in the fog zone to interact with the surface of the solid. The fog zone of molten coating material is also produced continuously, so that the process flow as a whole is continuous and essentially any desired quantities of encapsulated sodium percarbonate can be produced on a large scale.

The contact time of the individual solid particles in the fog zone of molten encapsulant is made extremely brief and is on the order of seconds at most, preferably not more than about a second, and usually only fractions of a second. Thus contact times of the individual solid particles in the range of up to about 0.5 second are generally completely sufficient to assure an adequate coating of the disperse liquid phase on the surface of the solid particles which form sealing capsules of controllable thickness around the solid particles. The unavoidable heating of the core material is limited to the heat of condensation of the molten portion released at the surface of the solid. Here the process according to the invention provides another important assistance:

In the preferred operation of the process the freshly coated finely particulate material is immediately picked up in a flow of cooling gas. The cooling gas flow can be controlled by volume, flow velocity and temperature so as to assure practically instant solidification and cooling of the thin coat of encapsulant which was coated as the molten phase. Precooled air proves to be a particularly suitable auxiliary gas. One particularly important embodiment of the invention used a cooling gas stream adjusted to the cooling temperature required under the particular process conditions by mixing air with appropriate amounts of liquid nitrogen. This has two effects according to the invention: Any perceptible heat remaining is removed from the coated capsules around the individual particles, so that it does not flow into the sodium percarbonate particle. That reliably prevents undesired thermal stress of the thermally sensitive material being coated. In addition, the shock cooling of the coated material causes sufficient hardening of the coated encapsulant that undesired sticking and agglomeration can be prevented. More extensive elements of the teaching of the invention must be considered in this respect. They are discussed in the following.

The process according to the invention, with the elements presented here, goes back to a type of process which has been known for nearly 10 years, as, for instance, from European Patent 048 312. That publication describes a process, and an apparatus to carry it out, for continuous mixing of a liquid phase and a powder phase, producing an essentially homogeneous mixture. The disclosure depicts a mixing apparatus shaped like a wheel, in which two separately formed and driven wheel-like disks are superimposed. A powdered solid is fed to one disk, and the liquid component is fed to the one below. The two disks rotate rapidly at speeds from a few hundred to a few thousand revolutions per minute. The speed can, for instance, be 1,000 to 5,000 revolutions per minute. The disk surfaces to which the components are fed, and especially the edge of the disk carrying the liquid, are shaped so that (1) the fog zone is spun off the edge of the wheel running at high speed and continually reformed, and (2) the powdered solid fed continuously to the other wheel-shaped element is spun off through the fog zone of the liquid. Because of the high working speeds of the two sub-elements, the period of contact between the two phases of material is very brief, giving the result desired in the invention of only very brief contact of the solid particles with the warm or hot fog phase.

Devices of the type depicted here have proved usable, including use for solving the complex problem such as was initially presented for the invention. The expert community has apparently not recognized that this offers new possibilities for improved production of a stabilized finely powdered sodium percarbonate with high storage stability and high retention of the peroxide content. A more extensive application of the device from European Patent 048 312 is described in European Patent 306 465, for example. Here components, particularly organic components such as enzymes, penicillin compounds or other antibiotics, vitamins, microorganism cultures, and the like are coated with melts of fats, paraffins, fatty acid esters, polyethylene glycol, fatty acids, and the like. That patent did not consider products of the nature of sodium percarbonate for use in textile washing agents or cleaning agents, as examples. Rather, it dealt with developments in the field of pharmaceutical products in particular. Comparisons are not possible here either from the nature of the material or from the quantity of material required to be produced.

Although it is entirely possible to accomplish the teaching of the invention in devices of the type last depicted, working in the sense of the invention is not limited to that. For working according to the invention it is important to maintain the principal elements presented: that the finely divided powder based on sodium percarbonate fed in a continuous flow is centrifugally atomized into a fog zone which is also continuously generated, so that the individual solid particles are coated with the melted phase in a short contact period, and then the solid particles immediately leave the fog zone and, preferably, enter a flow of cooling gas.

All the organic substances previously known for this purpose, especially the anhydrous ones, are suitable coating materials to make up the molten fog zone if their nature is such that they form a fog zone and produce, under standard conditions, a solid and adequately water-tight protective coating on the solid particles. In the sense of the process according to the invention, substances which meet a broader objective are preferred: Ecological considerations make it seem desirable, for chemicals that will be used in practice in large quantities, that the individual components of such mixtures of active ingredients be adequately compatible with the environment. For washing agents and cleaning agents in particular, that means that ecologically acceptable components which are easily degradable in wastewater treatment plants should be used in whole or in part.

The strictly technological function of adequately encapsulating and sealing off a sodium percarbonate particle can be achieved with suitable paraffin waxes, for example. But ecological considerations can make it seem desirable that such components, at least predominantly paraffinic, have at least one molecular functional group allowing bacterial attack and thus natural degradation of such components. As is well known, examples of functional groups for aerobic and perhaps also anaerobic degradation include carboxyl, alcohol, ether and/or ester groups. Particularly suitable coating materials in the sense of operations according to the invention are thus, in one embodiment, compounds of this nature which have paraffinic structure in at least the predominant portion of the molecule, but which contain at least one of these functional groups in the molecule.

The solidification temperatures or ranges of the coating materials are generally at least 35° C. and preferably above 40° C. It has proved possible to utilize coating materials with solidification temperatures or melting points up to about 150° C. Particularly suitable representatives of these compounds have melting points and solidification temperatures in the range from about 45° to 110° C. According to the invention it can be preferable for the organic materials forming the coating to have solidification points at or above 50° C.

In this connection, another element of the invention must be taken into consideration for the preferred technical operation: Because of the large amounts of the layer-forming substances involved here, it will generally not be possible to use single pure materials. Instead, mixtures with more or less greatly differing melting or softening points will be used. The mixed materials generally to not have definite melting points or solidification points, but instead a more or less broad solidification range. To optimize the process according to the invention it can be important to select or specify relatively narrow solidification ranges in the coating materials to be used. Thus, in the preferred embodiment a mixture of coating substances—generally made up a multiplicity of individual component—having a solidification range of not more than about 10° C. and preferably not more than about 5° C. is used. In one important embodiment of the invention the coating material used according to the invention has a solidification range not greater than about 3° C.

In one important embodiment of the process according to the invention the temperature of the molten coating material distributed in the fog zone is determined with respect to the solidification range of the coating material as follows: As a general rule it is convenient to set the temperature of the molten coating material in the fog zone at least 5° C. to 10° C. above its solidification range. On the other hand, it is also desirable not to select excessively high temperatures, again with respect to the solidification range of the coating material. Thus particularly suitable temperature ranges for the liquid droplets in the fog zone are from 10° C. to 50° C. above the solidification temperature of the coating material, and especially from about 15° C. to 35° C. above that temperature.

Actual examples of coating materials in the sense of the invention are long-chain saturated carboxylic acids and/or corresponding saturated alcohols. Components of this type usually contain up to about 24 C atoms in the molecule. Comparable esters are suitable, especially wax esters based on long-chain monofunctional carboxylic acids and corresponding alcohols, such as beeswax or carnauba wax. Mixtures of various waxes, or of those waxes with monofunctional long-chain alcohols such as hexadecanol have proved to be very suitable. Instead of the natural waxes mentioned here, comparable synthetic wax esters can also be used on a large scale. Other suitable water-insoluble capsule materials include fatty acid glycerol esters, fatty acid alkalolamides and high-molecular-weight polyethylene glycols, e.g., PEG 12,000. As already stated, particularly suitable coating materials are those which are easily degraded in wastewater treatment. The preferred compounds here are at least predominantly straight-chain carboxylic acids, carboxylic acid esters, alcohols and/or ethers having the specified solidification range. Materials that are at least predominantly of natural origin can, for example, be particularly important for ecological masons.

The capsule around the sodium percarbonate core can be a single layer, or it can, if desired, be made in multiple layers. In the latter embodiment, it is convenient to coat at least the layer of capsule material directly in contact with the sodium percarbonate by the process according to the invention. Any further layers on top of that are produced from the same material or from a different material than the first layer. The manner of coating such added capsule layers can be selected in the sense of the process according to the invention, but it is also possible to use quite different coating methods here. Because of the first layer that has been applied according to the invention, other methods can now be used with relative freedom from problems. For instance, the older German Patent Application P 41 09 953.2 by the applicant describes an encapsulated finely divided sodium percarbonate with increased resistance to loss of peroxide on storage. It is surrounded by a single-layer or, preferably, a multilayer closed protective capsule containing, at least in part, water-soluble polymers of natural and/or synthetic origin which have been dried onto the particles. The coating materials have a glass transition temperature which is at least 10° C. above the working temperature when an aqueous polymer solution is used for the coating, and are applied by means of an aqueous preparation of the polymers. Such a process step can be combined with the teaching of this invention without having to give up the advantages which the invention presents. The first layer of the melted coat according to the invention acts as a barrier to undesired entry of water into the percarbonate core, so that water used as an aid to coating can be dried up completely. Thus the object of the invention includes the combination of the teaching discussed here with the disclosure of the older application, P 41 09 953.2. The object of this older application is hereby expressly also made an object of the disclosure of this invention.

Still another possibility is combination of the teaching of the invention with the processes of the older German Patent Application P 41 09 954.0 by the applicant, the disclosure of which is hereby also expressly made an object of this disclosure. That application describes forming the capsule on the percarbonate with long-chain aliphatic carboxylic acids having at least 8 C atoms, characterized by the fact that the capsule material consists at least partly of a mixture of a) at least one carboxylic acid melting below 35° C. and b) at least one carboxylic acid melting at or above 35° C.

Such a protective layer, or at least its innermost layer, can be applied in the sense of the process according to the invention from the fog zone of the molten coating material. In order to produce a multilayer capsule the outer layers of the capsule can also be applied by other coating processes cited in the older application mentioned.

Another variation, particularly preferred, consists of using, as the envelope material in the process according to the invention, a mixture of substances that acts to control foam when used in detergent solutions. It is preferable to use a mixture such as is described in German Patent Application 37 32 947. Its disclosure is to this extent therefore to be considered as a disclosure of this application. This is a defoaming mixture that is free of siloxane polymers and of emulsifying or dispersing tensides, and is a homogeneous mixture of the following components:

(a) 25 to 60 percent by weight of a paraffin wax or a mixture of paraffin waxes, (b) 10 to 60 percent by weight of microcrystalline paraffin wax, whereby the proportion of liquid components in the mixture of (a) and (b), as determined by differential thermal analysis (DTA), shall be 0% at −15° C., 0% to 5% at 0° C., 2% to 25% at 25° C., 20% to 80% at 50° C., 80% to 100% at 75° C., and 100% above 90° C., (c) 5 to 20 percent by weight of a diamide derived from $C_{2-7}$ diamines and saturated $C_{12-22}$ fatty acids, which is in a finely divided form having a particle size less than 50 μm, with at least 90% of the particles being smaller than 30 μm.

While German Patent 37 32 947 mentions the incompatibility of the defoaming mixture with alkaline carriers such as sodium carbonate, it has now been found, surprisingly, that sodium percarbonate is compatible with the mixture, although it is no less alkaline than sodium carbonate.

Another major advantage to use of the defoaming mixture as a capsule material for sodium percarbonate, along with the stabilization of the percarbonate, is that the proportions of sodium percarbonate and the defoamer coated on it can easily be adjusted so that when the encapsulated percarbonate is used in a complete washing agent both components are introduced in the amounts in which they are needed in the washing liquid. That does not apply in general to the combinations of defoamer mixture with other core materials (carriers) listed in German Patent 37 32 947, so that in those combinations neutral salts such as sodium sulfate made up the greater part of the carrier material. Such neutral salts are considered as unnecessary diluents in modern washing agents.

The paraffin waxes in the defoaming mixtures are general complex mixtures without sharp melting points or solidification points. Their melting ranges are determined by differential thermal analysis (See the journal "The Analyst", 87 (1962), pages 420–434). Soft or hard paraffins and their mixtures, which do not show very distinct crystallization behavior and which generally have a softening and melting range between 10° C. and 60° C., preferably 20° C. to 55° C., are suitable as component (a). Such paraffins and paraffin mixtures are known commercially as petrolatum, Vaseline, or hard or block paraffins. In selecting the paraffin fractions or a mixture of individual paraffin fractions one must be sure that there is both solid and liquid material within the given temperature range, which is determined by differential thermal analysis. This is accomplished, for instance, by selecting suitable paraffin fractions or by mixing appropriate proportions of semisolid soft paraffins and hard paraffins. Suitable mixtures contain, for example, 1 to 3 parts by weight of soft paraffin (Vaseline) having a softening and melting range of 25° C. to 42° C., preferably 30° C. to 40° C., and 3 to 1 parts of hard paraffin (block paraffin) having a softening and melting range of 40° C. to 60° C., preferably 42° C. to 55° C.

The proportion of component (a) in the defoamer mixture is generally 5 to 60, preferably 20 to 50 percent by weight.

Known microcrystalline paraffin waxes having a melting range of 55° C. to 90° C., preferably 60° C. to 80° C., are considered as component (b). Such microcrystalline waxes are, for instance, components of montan waxes or high-melting petroleum fractions (ceresin) and are characterized by a content of branched and cyclic paraffins. They generally make up 20 to 90 percent by weight, preferably 25 to 60 percent by weight, of the defoamer mixture. The nature and amount of components (a) and (b) should be chosen, within the given parameters, so that the proportions of solid and liquid components in the wax mixture, as determined by differential thermal analysis, have the following distribution as a function of the temperature:

| °C. | liquid | solid |
|---|---|---|
| 0° C. | 0–2% | 100–98% |
| 25° C. | 2–15% | 98–85% |
| 50° C. | 30–70% | 70–30% |
| 75° C. | 95–99% | 1–5% |
| 80° C. | 100% | 0% |

The distribution above takes into consideration the fact that even those paraffin mixtures that appear solid, or do not flow, at room temperature contain certain proportions of liquid paraffins.

Component (c) consists of bis-amides derived from saturated fatty acids having 12 to 22, preferably 14 to 18 C atoms and from alkylenediamines having 2 to 7 C atoms. Suitable fatty acids are lauric acid, myristic acid, stearic acid, arachidic acid, and behenic acid and their mixtures, such as are found in natural fats or hardened fatty oils such as tallow or hydrogenated palm oil. Suitable diamines are, for example, ethylenediamine, 1,3-propylenediamine, tetramethylenediamine, pentamethylenediamine, hexamethylenediamine, p-phenylenediamine and toluylenediamine. Ethylenediamine and hexamethylenediamine are preferred. Particularly preferred bis-amides are bis-myristoyl-ethylenediamine, bis-palmitoyl-ethylenediamine, bis-stearoyl-ethylenediamine, and their mixtures, as well as the corresponding derivatives of hexamethylenediamine.

The bis-amides, which are not soluble in the paraffin mixture, must be in finely divided form and have a particle size less than 50 µm, with at least 90% of the particles having a size of less than 30 µm. Preferably, the maximum particle size is less than 20 µm, with at least 50%, and particularly preferably at least 75%, of the particles smaller than 10 µm. These particle size data refer to the well-known method of determination using the "Coulter Counter".

The defoamer mixture can be made by introducing the finely divided bis-amide (component (c)) into a melt of components (a) and (b) and homogenizing it into the melt by intensive stirring. The temperature of the melt should be at least 90° C. and at most 200° C. The temperature is preferably 100° C. to 150° C. Existence of a stable dispersion of the bis-amide particles in the paraffin matrix, produced by the particle size as defined in the invention, is important for good activity of the defoamer. In order to produce this state of dispersion, one can use a bis-amide already having the appropriate particle size and disperse it, or one can use a more coarsely divided starting material and subject the melt to milling using colloid mills, annular gear mills, or ball mills until the desired particle size is attained. This is a preferred way of operating.

Also, an appropriately fine-grained distribution of the bis-amide can be produced by completely melting the bis-amide in the paraffin melt and then chilling it rapidly to a temperature below the solidification point of the bis-amide, simultaneously homogenizing the melt. In selecting the temperature of the melt one should take into consideration the fact that the melting range of technical bis-stearoylethylenediamide in the paraffin melt, determined by Differential Thermal Analysis, is about in the range of 123° to 137° C., while the melting range of bis-stearoylhexamethylenediamide is in the range of 132° to 141° C. The ranges for the corresponding bis-myristoylamides are 119° to 135° C. and 130 to 138° C. The bis-amides are practically insoluble in the melt below the solidification range.

It was found, surprisingly, that mixtures with particularly high defoaming activity were obtained if one does not disperse the bis-amides themselves in the paraffin melt, but instead disperses starting materials needed to produce them, i.e., the diamines and fatty acids or their functional derivatives, and then converts them to the bis-amides by carrying out a suitable reaction. Functional derivatives include, for example, anhydrides, chlorides, bromides or esters, such as the methyl esters. The molar ratio of diamine to fatty acid can be from 1:1.5 to 1:2.2, and is preferably from 1:1.8 to 1:2. There is no disadvantage if an excess of one of the reactants remains in the mixture.

The amidation reaction can be accelerated by adding suitable catalysts. If free fatty acids are used, then acidic catalysts such as p-toluenesulfonic acid or hydroxybenzenesulfonic acid are preferred. The proportion of catalyst is conveniently 2 to 12 mol-%, based on the number of moles of bis-amide to be produced. Surprisingly, it was found that the defoaming action of the final product tends to increase with increasing proportion of the catalyst. This is possibly due to involvement of the catalyst in formation of byproducts which remain in the defoamer mixture. The proportion of catalyst is preferably 3 to 10 mol-%, based on the bis-amide.

The conversion proceeds at elevated temperatures, e.g., at 100° to 150° C. The reaction mixture is mixed thoroughly and the water resulting from the reaction is distilled off. Other volatile reaction products, such as methanol when fatty acid methyl esters are used, are also distilled off. Expulsion of the volatile components is promoted by introducing inert gases, such as nitrogen. It is convenient to increase the temperature as the reaction progresses. Residues of volatile components can be removed under reduced pressure. The mixture of bis-amides and paraffins that is obtained, containing especially finely divided bis-amides, can be used immediately for further processing.

The protective layer around the percarbonate granule is usually applied in a proportion of at least about 1% by weight, and preferably at least about 2% by weight, based on the finished product. It can be practical to add even higher proportions to the granule, for instance, with at least about 5% by weight of the coating material on the granule. As a general rule, though, there is no more than about 15–20% by weight of the coating material, based on the finished product, even with multilayer coatings. It is preferably to apply from 3% to 12% by weight of the defoamer mixture described above.

The process according to the invention is suitable for encapsulating a finely divided sodium percarbonate, especially with particle sizes n the range of about 0.1 to 2 mm diameter. Granule sizes between about 0.2 and 0.8 mm can be particularly suitable, on the basis of the application technology. The process according to the invention makes possible the application and hardening of the protective envelope around appropriately preformed crystalline material without substantial additional agglomeration to form larger particles. On the other hand, the process of the invention certainly also makes it possible to achieve intentional agglomeration into predefinable particle sizes by varying the process parameters in the coating process.

Crystalline material is usually used as the percarbonate for treatment in the process according to the invention. Both highly pure and technical grades, as offered by various manufacturers, are suitable. The technical grades usually already contain additives worked into the material during manufacture or during the subsequent granulation of the material in order to improve the crystal properties, stability, pourability, or other properties. These additives are usually present in the technical products on the order of a few percent by weight. They are usually inorganic compounds, primarily chlorides, silicates, or phosphates of alkali or alkaline earth metals. The active oxygen content, which is 15.35 by weight in pure sodium percarbonate, is generally from about 13 to 14.5% by weight in the technical grades. Complexing agents, such as polycarboxylic acids, polyphosphonic acids, or aminopolycarboxylic acids or their salts, can be included in the sodium percarbonate and/or the capsule material as stabilizers in known ways, as well as other auxiliary materials and additives.

EXAMPLES

Finely crystalline sodium percarbonate (average particle size about 0.5 mm) was used as the solid phase in a device according to European Patent Application 1 048 312. Various encapsulating materials were used as the molten phase to produce the fog in a series of experiments. The following capsule materials were used to make single-layer coatings in the proportion of 10% by weight on the sodium percarbonate particles to be encapsulated: Polyethylene glycol 12,000, beeswax, and a wax-like paraffinic hydrocarbon mixture (Paraffin 4230). The solidification ranges of these capsule materials were as follows:

PEG 12,000: 58°–62° C.

Beeswax: 60°–66° C.

Paraffin 4230: 42°–44° C.

Temperatures about 20° C. above the particular solidification ranges were established as the melt and working temperature to generate the fog zone.

The turbine speed was about 3,000 rpm. The coated solid material leaving the fog zone was subjected to immediate shock cooling by cold air in a cooling distance about 2 m long.

Different turbine units and/or flow limiters were used in experimental series A and B.

The sodium percarbonate particles coated in this manner were stored, some in an open glass vessel and some in a closed glass vessel, both at room temperature and at 40° C. for a total period of 6 weeks. The active oxygen (AO) content was determined at the beginning of the storage period and then at weekly intervals. The values found are shown in the following table.

In a more extensive series of experiments, the coated materials based on sodium percarbonate from Table 1 were mixed with a textile washing agent ("Dixan" TP Mixture). Here, too, the various product samples were stored in open and closed glass vessels at room temperature and, in parallel experiments, at 40° C. Here, again, the active oxygen content was determined at the beginning of the 6-week storage period and then at weekly intervals. The results are shown in Table 2, below.

TABLE 1

| Experiment No. | AO Content initial | Storage conditions | AO content after 1 week | AO content after 2 weeks | AO content after 3 weeks | AO content after 4 weeks | AO content after 6 weeks | Percent still active |
| --- | --- | --- | --- | --- | --- | --- | --- | --- |
| (A) 10% PEG 12,000 | 11.80 | open RT | 11.80 | 11.80 | 11.80 | 11.76 | 11.36 | 96.27 |
| | | open 40° C. | 11.75 | 11.64 | 11.50 | 11.50 | 11.96 | 101.36 |
| | | closed RT | 11.80 | 11.80 | 11.80 | 11.80 | 11.31 | 95.85 |
| | | closed 40° C. | 11.75 | 11.68 | 11.56 | 11.54 | 12.32 | 104.41 |
| (B) 10% PEG 12,000 | 11.58 | open RT | 11.06 | 11.58 | 11.58 | 11.58 | 10.97 | 94.73 |
| | | open 40° C. | 10.86 | 11.66 | 11.52 | 11.52 | 11.80 | 101.90 |
| | | closed RT | 11.20 | 11.58 | 11.58 | 11.58 | 11.25 | 97.15 |
| | | closed 40° C. | 10.94 | 11.56 | 11.55 | 11.55 | 11.56 | 99.83 |
| (A) 10% beeswax | 11.54 | open RT | 10.94 | 10.92 | 9.80 | 8.30 | 9.76 | 84.58 |
| | | open 40° C. | 10.90 | 10.90 | 10.82 | 10.50 | 10.13 | 87.78 |
| | | closed RT | 10.94 | 10.26 | 9.84 | 8.30 | 9.31 | 80.68 |
| | | closed 40° C. | 10.82 | 10.81 | 10.82 | 10.54 | 9.58 | 83.02 |

TABLE 1-continued

| Experiment No. | AO Content initial | Storage conditions | AO content after 1 week | AO content after 2 weeks | AO content after 3 weeks | AO content after 4 weeks | AO content after 6 weeks | Percent still active |
|---|---|---|---|---|---|---|---|---|
| (B) 10% beeswax | 11.62 | open RT | 11.58 | 11.50 | 11.48 | 11.44 | 10.39 | 89.41 |
| | | open 40° C. | 10.07 | 11.00 | 9.96 | 9.94 | 11.11 | 95.61 |
| | | closed RT | 11.60 | 11.50 | 11.46 | 11.46 | 10.70 | 92.08 |
| | | closed 40° C. | 10.10 | 11.04 | 10.00 | 9.99 | 10.56 | 90.88 |
| 10% paraffin 4230 | 11.92 | open RT | 10.58 | 11.92 | 11.90 | 11.90 | 11.63 | 97.57 |
| | | open 40° C. | 10.37 | 10.37 | 10.34 | 10.34 | 9.28 | 77.85 |
| | | closed RT | 10.60 | 11.92 | 11.91 | 11.91 | 10.62 | 89.09 |
| | | closed 40° C. | 10.40 | 10.38 | 10.38 | 10.34 | 10.13 | 84.98 |

TABLE 2

| Experiment No. | AO Content initial | Storage conditions | AO content after 1 week | AO content after 2 weeks | AO content after 3 weeks | AO content after 4 weeks | AO content after 6 weeks | Percent still active |
|---|---|---|---|---|---|---|---|---|
| (A) 10% PEG 12,000 | 2.54 | open RT | 2.54 | 2.30 | 2.04 | 1.92 | 1.72 | 67.72 |
| | | open 40° C. | 2.50 | 2.14 | 1.82 | 1.44 | 1.28 | 50.39 |
| | | closed RT | 2.54 | 2.32 | 2.08 | 1.93 | 2.01 | 79.13 |
| | | closed 40° C. | 2.52 | 2.18 | 1.84 | 1.46 | 0.95 | 37.40 |
| (B) PEG | 2.62 | open RT | 2.60 | 2.44 | 2.18 | 2.04 | 2.02 | 77.10 |
| | | open 40° C. | 2.54 | 2.25 | 1.90 | 1.60 | 1.31 | 50.00 |
| | | closed RT | 2.60 | 2.44 | 2.20 | 2.06 | 1.97 | 75.19 |
| | | closed 40° C. | 2.56 | 2.26 | 1.90 | 1.64 | 0.84 | 32.06 |
| (A) 10% beeswax | 2.54 | open RT | 2.38 | 2.18 | 1.94 | 1.78 | 1.83 | 72.05 |
| | | open 40° C. | 2.24 | 2.02 | 1.88 | 1.56 | 1.65 | 64.96 |
| | | closed RT | 2.38 | 2.18 | 1.98 | 1.79 | 1.96 | 77.17 |
| | | closed 40° C. | 2.26 | 2.04 | 1.88 | 1.57 | 1.31 | 51.57 |
| (B) 10% beeswax | 2.55 | open RT | 3.36 | 2.26 | 1.98 | 1.80 | 1.77 | 69.41 |
| | | open 40° C. | 2.21 | 2.16 | 1.92 | 1.74 | 1.61 | 63.14 |
| | | closed RT | 2.36 | 2.28 | 1.98 | 1.83 | 1.84 | 72.16 |
| | | closed 40° C. | 2.24 | 2.16 | 1.94 | 1.77 | 1.53 | 60.00 |
| 10% paraffin 4230 | 2.60 | open RT | 2.56 | 2.36 | 2.20 | 2.00 | 2.23 | 85.77 |
| | | open 40° C. | 2.52 | 2.34 | 2.08 | 1.96 | 2.60 | 100.00 |
| | | closed RT | 2.56 | 2.38 | 2.22 | 2.00 | 1.92 | 73.85 |
| | | closed 40° C. | 2.52 | 2.36 | 2.14 | 2.01 | 2.80 | 107.69 |

We claim:

1. A process for melt-coating a coating material that is solid at room temperature onto finely divided solid sodium percarbonate particles, comprising centrifugally atomizing a finely divided solid coating material in a continuous flow through a likewise continuously generated fog zone of said coating material in molten form to thereby obtain nonaqueous encapsulation of said solid sodium percarbonate with a hydrophobic protective coating of said coating material, wherein said coating material is a defoamer mixture free of siloxane polymer, emulsifying or dispersing tenside and is a homogeneous mixture of:

a) 25 to 60 percent by weight of a paraffin wax or a mixture of paraffin waxes, b) 10 to 60 percent by weight of microcrystalline paraffin wax, whereby the proportion of liquid components in the mixture of (a) and (b), as determined by differential thermal analysis (DTA) is 0% at −15° C., 0% to 5% at 0° C., 2% to 25% at 25° C., 20% to 80% at 50° C., 80% to 100% at 75° C. and 100% above 90° C., c) 5 to 20 percent by weight of a diamide derived from $C_{2-7}$ diamines and saturated $C_{12-22}$ fatty acids, which is present in finely divided form and has a particle size of less than 50 μm, with at least 90% of the particles smaller than 30 μm.

2. The process according to claim 1 wherein said sodium percarbonate resides in said fog zone for less than one second.

3. The process according to claim 2 wherein said sodium percarbonate resides in said fog zone for less than 0.5 seconds.

4. The process according to claim 2 further comprising immediately cooling said sodium percarbonate after being coated.

5. The process according to claim 4 wherein said cooling is carried out by subjecting said sodium percarbonate to a cooling gas flow.

6. The process according to claim 5 wherein the cooling gas flow is air or liquid nitrogen.

7. The process according to claim 6 wherein the air or liquid nitrogen is added in such volume proportions that adhesions among the freshly coated protective coatings are largely prevented.

8. The process according to claim 1, further comprising immediately cooling said sodium percarbonate after being coated.

9. The process according to claim 8 wherein said cooling is carried out by subjecting said sodium percarbonate to a cooling gas flow.

10. The process according to claim 9 wherein said cooling gas flow is air or liquid nitrogen.

11. The process according to claim 10 further comprising maintaining the air or liquid nitrogen in such volume proportions that adhesions among the freshly coated protective coatings are largely prevented.

12. The process according to claim 1 wherein said coating material has a solidification temperature above 40° C., which does not exceed 150° C.

13. The process according to claim 12 wherein the solidification temperature is above about 50° C.

14. The process according to claim 12 wherein the solidification temperature is 45° to 110° C.

15. The process according to claim 1 wherein said coating material has a narrow solidification range.

16. The process according to claim 15 wherein said narrow solidification range is not more than about 10° C.

17. The process according to claim 15 wherein said narrow solidification range is not more than about 5° C.

18. The process according to claim 1 further comprising adjusting the temperature of the atomized coating material in the fog zone to a value in the range of about 10° to 50° C. above the solidification temperature or range of the coating material.

19. The process according to claim 1 wherein said coating materials are at least predominantly of natural origin.

20. The process according to claim 1 further comprising wherein the protective coating layer is applied in the proportions of about 2% by weight at least based on the finished product, and the proportion of the protective layer as a whole is no more than about 15 to 20% by weight.

21. The process according to claim 20 wherein the amount is about 5% by weight.

22. Sodium percarbonate powder provided with a protective coating of a water-repelling coating material, suitable for mixing into solid washing and/or cleaning agents, wherein said protective coating is applied by the process of claim 1.

23. The sodium percarbonate powder according to claim 22 further comprising that it is a practically unagglomerated pourable material with particle sizes in the range of about 0.1 to 2 mm.

24. The sodium percarbonate powder according to claim 22 further comprising that it also contains in the sodium percarbonate core and/or in the coating material a stabilizer for sodium percarbonate.

25. The sodium percarbonate powder according to claim 24 wherein complexing agents for metal binding are present.

* * * * *